United States Patent [19]

Esten

[11] 4,135,323

[45] Jan. 23, 1979

[54] SONIC FISHING LURE

[76] Inventor: Harold Esten, 73 Messenger La., Willingboro, N.J. 08046

[21] Appl. No.: 796,907

[22] Filed: May 13, 1977

[51] Int. Cl.² .............................................. A01K 85/00
[52] U.S. Cl. .................................. 43/42.16; 43/42.12; 43/42.14; 43/42.31
[58] Field of Search .................... 43/17.1, 26.2, 42.06, 43/42.12, 42.13, 42.14, 42.16, 42.17, 42.18, 42.19, 42.2, 42.31; 46/52

[56] References Cited

U.S. PATENT DOCUMENTS

| 2,977,705 | 4/1961 | Busnel | 43/17.1 |
| 3,165,854 | 1/1965 | Teetor | 43/17.1 |
| 3,296,733 | 1/1967 | McLean | 43/42.31 |
| 3,397,478 | 8/1968 | Lowes | 43/17.1 |
| 3,414,873 | 12/1968 | Richard | 43/17.1 |
| 3,909,973 | 10/1975 | Fairbanks | 43/17.1 |

*Primary Examiner*—Nicholas P. Godici
*Attorney, Agent, or Firm*—Beveridge, DeGrandi, Kline & Lunsford

[57] ABSTRACT

The sonic frequency emitted by a fishing lure is proportional to the lure velocity through the water. Three frequencies which form a musical triad are generated simultaneously. Sound is produced by relative rotation of a forward propeller and a rear sonic generator. Blades on the propeller produce relative rotation, and gaps between the blades discharge discrete rearwardly-directed streams of water. The sonic generator has vanes which lie in the path of the streams of water to produce sonic waves.

10 Claims, 9 Drawing Figures

SONIC FISHING LURE

BACKGROUND AND SUMMARY OF THE INVENTION

It is known that fish are attracted by some sounds. A well-known animated film showed fish enticed by and swimming around an underwater speaker playing a waltz. Live insects create noises which are audible to fish, frequently resulting in a fish's almost immediate "striking" the insect. An example of the latter is the cicada or locust which produces a loud shrill sound which fish find irrestible.

Many sonic lures have been proposed to attract fish. Typically, these have been battery operated buzzers or trolling lures which have low resonant frequencies that emit sound when excited by the relative motion of the lure through the water.

The present invention differs from any of the prior sonic fishing lures. Rather than emitting a single characteristic sound at all velocities, this invention produces musical notes whose frequency is a controllable variable, being directly proportional to the relative velocity of the lure through the water.

This is achieved by providing the lure with a first member, a second member positioned rearwardly of the first member, means for producing relative rotational movement between the members at a angular velocity substantially directly proportional to the forward velocity of the lure through the water, the members having means for generating sonic waves of a frequency substantially directly proportional to their relative angular velocity. Along with this, a simultaneous control of overtones can be effected. The combination of single frequency control and overtone control affords better simulation of natural insect sounds and is a more effective fishing lure.

This invention also relates to lures which, rather than providing single frequency musical notes, are constructed to produce a simultaneous combination of musical notes, preferably a triad in either the major or minor scale. This is achieved by providing a lure which while moving through the water at any given velocity has a first means for generating sonic waves of one frequency, second means for generating sonic waves of a second frequency and third means for generating sonic waves of a third frequency, these frequencies together forming a musical triad. Fish are attracted by the enticing sounds and trail the lure closely, eventually investigating it for its edible qualities with the inevitable result of another happy fisherman.

In another respect, the invention involves the specific preferred construction of a lure which has attachment means connectible by a fishing line so that movement of the fishing line will draw the lure forwardly in the water. A rotary member such as a propeller is supported for rotational movement about the longitudinal axis of the device and has blades with surfaces lying at acute angles to the longitudinal axis. A second member which lies adjacent to the rotary member is provided with obstructions which lie in the path of water moving between the blades, these obstructions being discontinuous in directions circumferential to the longitudinal axis, thereby presenting a varying impediment to water flowing between the blades to generate sonic waves in the water.

THE DRAWINGS

DESCRIPTION OF THE PREFERRED EMBODIMENTS

Figure 1:
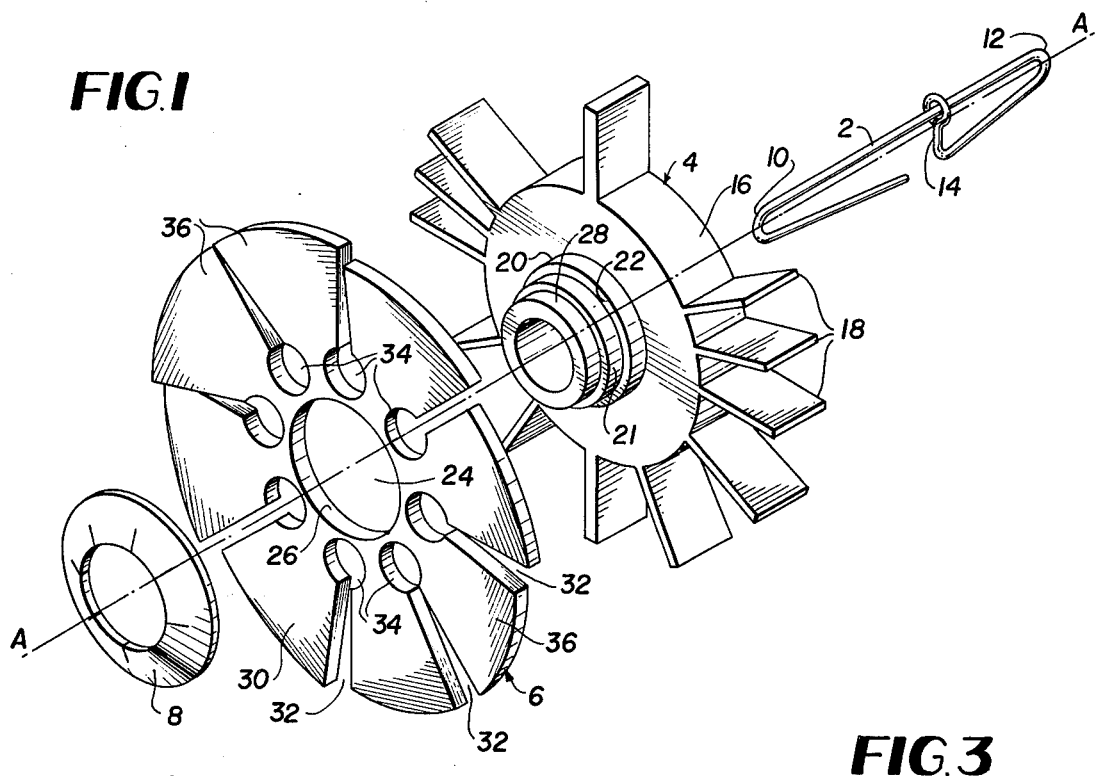
FIG. 1 is an exploded perspective view of a preferred embodiment of the invention wherein the lure will generate a musical triad in the major scale.

The four elements of the preferred embodiment of the device are shown in exploded fashion in FIG. 1, aligned along the longitudinal axis A—A of the lure. A central pin or wire clasp 2 extends axially through a sonic generator 4, a rotary propeller 6 and a push-on washer 8. A bend 10 at the forward end of the wire clasp 2 forms a loop for receiving a fishing line so that movement of the fishing line will draw the lure forwardly in the water. All four elements are preferably made of noncorrosive materials; and, the sonic generator 4 and rotary propeller 6 are preferably made of self-lubricating low friction materials such as the widely available injection molded plastics.

Figure 2:
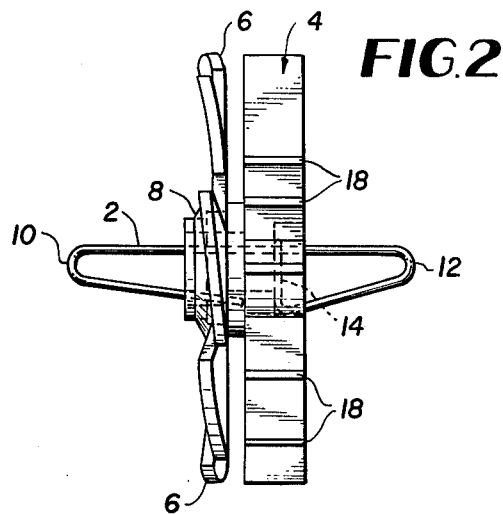
FIG. 2 is a side elevation of the device shown in FIG. 1 in assembled condition.

At the rear end of the wire clasp 2 is a bend 12 extending forwardly to a transverse leg 14 which is looped at its upper end to encircle the linear portion of the clasp 2. As shown in FIG. 2, the leg 14 abuts the rear of a recess formed in the rear surface of the sonic generator 4.

The sonic generator 4 has a main body portion 16 and vanes 18 which extend outwardly from the main body. The arrangement and function of these vanes 18 will be discussed later in this specification.

On the forward end of the main body 16 of sonic generator 4, there is a boss 20 of a stepped conical design, the middle step 21 of which serves as an external cylindrical bearing surface for the propeller 6. The annular surface 22 acts as a spacer and thrust bearing for the propeller 6. The propeller 6 has a central opening 24 forming an internal cylindrical bearing surface 26 which rides on the external cylindrical bearing surface 21 on the sonic generator.

The propeller 6 is retained in position on the bearing surface 21 by the push-on washer 8 which has flexible tabs which bite into the cylindrical surface 28 on the sonic generator 4 to resist removal in a manner well known in the fastener art. When properly positioned, the propeller 6 is rotatable but axially immovable at a position forwardly of the sonic generator 4.

The propeller 6 is a rotatable member provided with a set of blades 30 separated by gaps 32 of substantially equal measurements taken circumferentially with respect to the axis A—A. Enlarged apertures 34 are located at the radially innermost end of each of the gaps 32. Each of the blades 30 is inclined so that its surface will lie at an acute angle to the longitudinal axis A—A, preferably at an angle of about 25°. It will readily be understood that the angulation of the blades will cause the propeller 6 to move rotationally about the longitudinal axis A—A in response to movement of the lure through the water.

In the embodiment of FIG. 1, sound is produced by discrete streams of water released through gaps 32 from the trailing edges of the blades 30 of rotatable propeller 6, striking the adjacent vanes 18 of the sonic generator. Although the vanes 18 do not prevent the flow of water through the gaps 32 between the blades 30, these vanes 18 have been characterized as obstructions located in the path of water moving between the blades 30. Each of the vanes 18 forms an obstruction which is discontinuous in directions circumferential to the axis A—A so that as the rotary propeller 6 turns, a varying impediment is presented to the flow of water between the blades, thus causing the generation of sonic waves in the water. Preferably, the thickness of the vanes 18 (the measurement circumferential with respect to the axis A—A) is at least as great as the width of the gaps 32.

It is believed that fish will be particularly attracted to sounds which comprise musical triads, and toward this end, the positioning of the vanes 18 in the embodiment of FIG. 1 is such that a musical triad will be produced. These vanes 18 may be analyzed as having three separate sets of vanes located in a common transverse plane, these sets being designated 18a, 18b and 18c in FIG. 3. The vanes 18a in the first set are spaced apart by 60° to produce a note of a given frequency when the lure is drawn through the water and the rotary propeller 6 rotates at a given velocity. Vanes 18b in the second set are positioned 72° apart to provide a musical tone of another frequency at the same trolling and rotational velocities; and, a third set is formed of vanes 18c which are spaced apart by an angular distance of 90°, providing yet a third sonic frequency at the same trolling and angular velocities. This particular spacing arrangement wherein the angular spacing between the vanes is at a ratio of 10:12:15 is particularly desirable as the notes produced will have the frequency ratio 4:5:6, forming a musical triad which in this instance is in the major scale. This is believed to enhance the fish-attracting capabilities of the lure of this invention.

In a similar fashion, the angular distance between the vanes 18 may be at a ratio of 6:5:4 to produce a frequency ratio of 10:12:15 which is a triad in the minor scale. This would result if the first set included ten blades spaced 36° apart, the second set was formed of twelve blades spaced 30° apart; and, the third set comprised fifteen blades spaced 24° apart.

Figure 3:
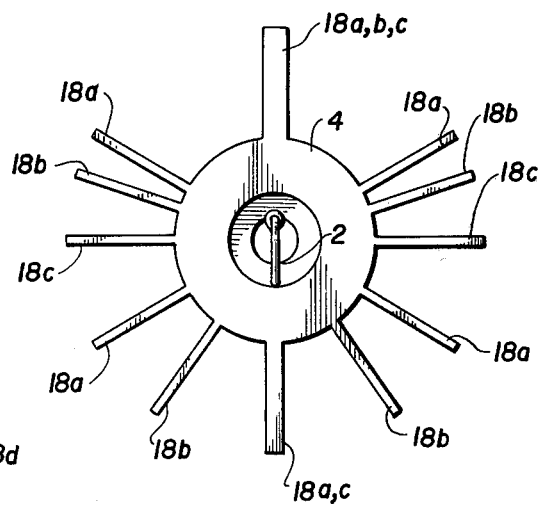
FIG. 3 is a rear elevation of the device of FIG. 1, with the propeller element removed.

The rotational velocity of the rotary propeller 6 is dependent upon the relative velocity between the lure and the water, which velocity is referred to herein generally as the lure velocity. The frequency of the sonic emissions will be lower for low lure velocities and higher for high lure velocities. However, at any given lure velocity, the device as illustrated in FIGS. 1, 2 and 3 will continue to produce the fish-attracting sound of a musical triad.

Figure 6:
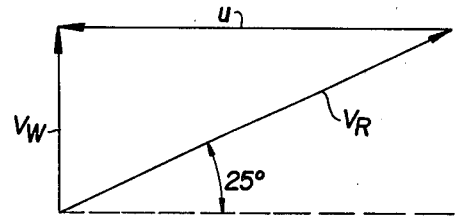
FIG. 6 is a vector diagram showing the relationship between blade angle, velocity of the lure through the water and tangential velocity of a blade cross section.
Figure 7:
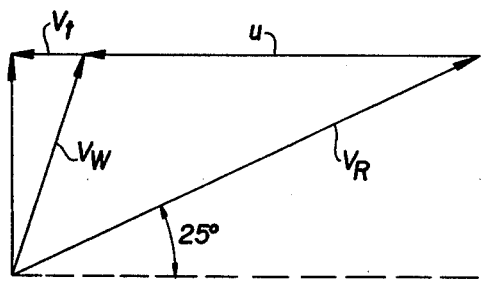
FIG. 7 is a vector diagram similar to FIG. 6, but also taking frictional losses into account.

The angular velocity of the propeller is a function of the axial velocity of the water relative to the propeller, the pitch of the propeller blades and the frictional torque of the propeller on its shaft. Consistent with the principle of conservation of angular momentum, if there were no friction, the water passing through the prop would produce no torque; the propeller would run at stall speed, and water would flow axially through the prop. With friction, the developed torque equals the frictional torque, increasing the angular momentum of the flow leaving the blades, diminishing the angular velocity of the propeller. The theories pertaining to the trolling velocities, rotary propeller velocities and sonic emissions is illustrated in FIGS. 6 and 7. In the absence of friction, and with a lure velocity of three feet per second and blades set at 25° to the transverse plane, the vector diagram of FIG. 6 is pertinent where u is the tangential velocity of the blade, $V_w$ is the lure velocity relative to the water and $V_r$ is the water velocity parallel and relative to the forward surface of the propeller blade.

Since the 3 ft/sec. lure velocity would remain unchanged then the tangential blade velocity u is determinable from the trigonometric relationship $$u = V_w/\tan 25° = 3/0.466 = 6.4 \text{ ft/sec.}$$

Accordingly, for the illustrated parts, the angular velocity W of the propeller $$w = u/r = 6.4/0.032 = 200 \text{ rad/sec} = 31.8 \text{ rev/sec.}$$

where r is the pitch radius of the propeller (0.032 ft.).

At this angular velocity, a propeller with eight blades as shown in FIGS. 1–3 will produce 254 blips/sec at each vane 18 of the sonic generator, resulting in frequencies of 1016 cps on vanes 18c, 1270 cps on vanes 18b and 1524 cps on vanes 18a. Reduction of the trolling speed to 1.04 ft/sec, would result in frequencies of 352, 440 and 528 cps, corresponding to a triad in the major scale with notes F, A and c. Elementary texts such as *Physics* by Erich Hausmann and Edgar P. Slack confirm that the ratios of frequencies, rather than the particular frequencies, determine the physiological effect upon the listener.

The members 4 and 6 are preferably formed of low friction materials such as injection molded plastics, so that the rotational velocity of the propeller is substantially unaffected by friction. The vector diagram of FIG. 7 pertains to a lure in which there is a friction coefficient ($\mu$) of 0.1 between the parts in relative motion, along with a thrust of the propeller against shoulder 22 which has a diameter of 0.281 inch.

$$F_{drag} = C_D A (p u^2/2) = 0.5 \times 0.0035 \times (1.94 \times 9/2) = 0.015 \text{ lbs.}$$

Where
  $F_{drag}$ is the drag force, (lbs.),
  $C_D$ is the drag coefficient (0.5),
  A is the propeller area, (0.0035 ft$^2$),
  p is the water density, (1.94 slugs/ft$^3$), and
  u is the trolling speed, (3 ft/sec).
The frictional force is the product of the drag force and the frictional coefficient, hence $$F_{drag} \times \mu = 0.015 \times 0.1 = 0.00166 \text{ lbs.}$$

Since this occurs at the propeller radius 0.14 in. (0.009 ft), the frictional torque $$T = 0.0015 \text{ lbs.} \times 0.009 \text{ ft} = 0.000018 \text{ ft.lb.}$$

This frictional torque must be overcome by an angular impulse imparted to the water leaving the prop. With a 0.5 in² (0.00347 ft²) frontal area at 3 ft/sec, the volumetric flow rate is $$Q = Av = 0.0035 \text{ ft}^2 \times 3 \text{ ft/sec} = 0.01 \text{ ft}^3/\text{sec}.$$

And the mass flow rate is $$M = Q\rho = 0.010 \text{ ft}^3/\text{sec} \times 1.94 \text{ slugs/ft}^3 = 0.0194 \text{ slugs/sec}.$$

Conservation of angular momentum dictates that $$T = Mv_t r,$$

and $$v_t = T/Mr = (0.000018/0.0194 \times 0.032) = 0.029 \text{ ft/sec}$$

where
$v_t$ is the circumferential velocity of the discharge flow,
T is the frictional torque (0.000018 ft. lbs.)
M is the mass flow rate (0.0194 slugs/sec), and
r is the pitch radius of the propeller (0.032 ft.).

The vector diagram corresponding to this discharge condition, show in FIG. 7, shows the blade velocity for this case is only 0.03 ft/sec less than for the idealized frictionless case.

It should be recognized from the above examples that with a self lubricating material for the part 2 which inherently yields low friction that the performance can be accurately estimated based upon the propeller at "stall."

Figure 4:
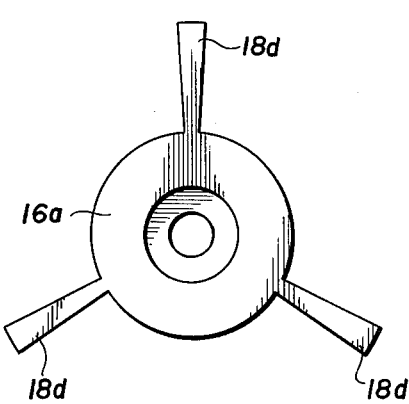
FIG. 4 is a rear view of an alternate form of sonic generator for generating with a propeller member a single frequency sound with strong overtones.

While sonic generators 4 which produce musical triads are preferred, the sonic generator 4 may be modified or replaced by other sonic generators. A sonic generator for producing a single frequency is shown in FIG. 4, being provided with a main body 16a and radiating vanes 18d spaced 120° apart. This would produce a single frequency with strong overtones.

Figure 5:
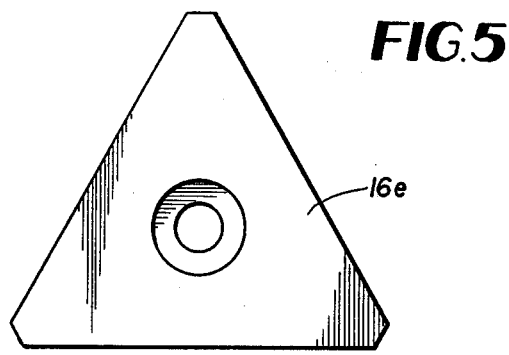
FIG. 5 is another sonic generator for producing with a propeller member a single frequency near-sinusoidal tone with reduced overtones.

A single frequency sonic generator with fewer overtones than produced by the device of FIG. 4 is shown at 16e in FIG. 5 which does not have a vaned structure but does by its triangular configuration provide a circumferentially-discontinuous obstruction, thus presenting a varying impediment to water flowing between the blades of the rotary propeller 6 to generate sonic waves in the water. In FIG. 5, the triangular shape will modulate the abrupt on-off characteristics experienced with the FIG. 4 sonic generator, thereby reducing the magnitude of the overtones and more nearly approaching a sinusoidal tone.

Figure 8:
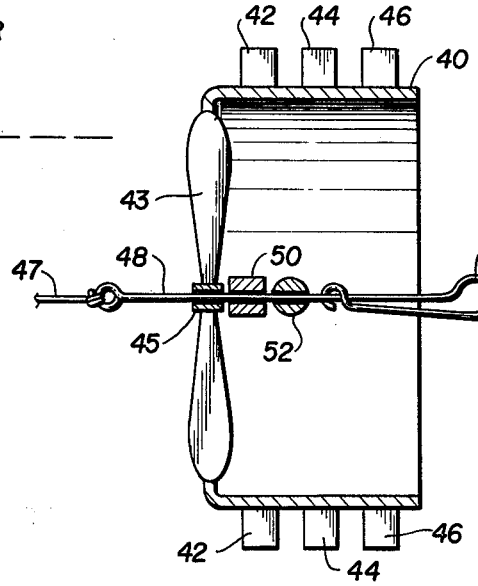
FIG. 8 is a second embodiment of the invention.
Figure 9:
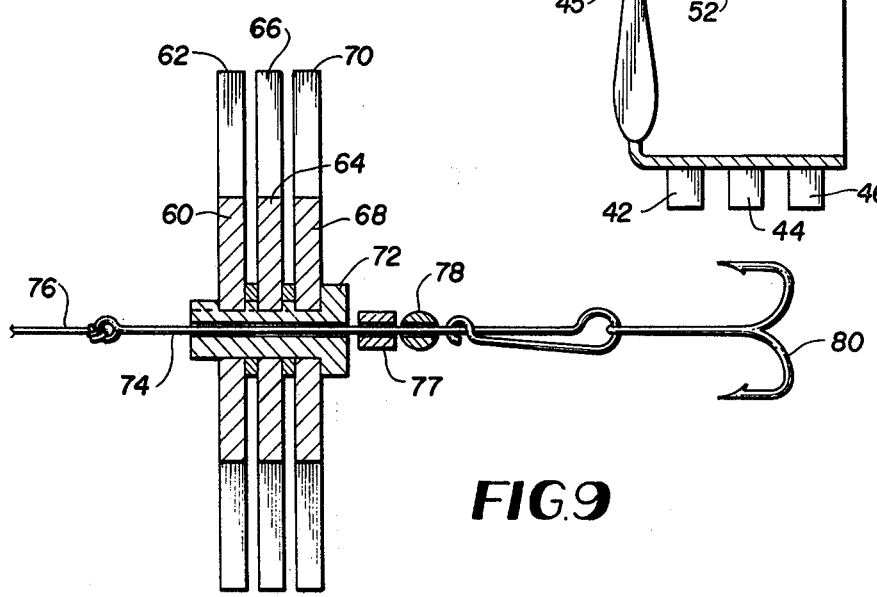
FIG. 9 is still another embodiment of the invention.

Modified versions of the device capable of producing musical triad sonic emissions are shown in FIGS. 8 and 9. In FIG. 8, a cylindrical main body 40 is provided on its exterior surface with a first set of vanes 42, a second set of vanes 44 and a third set of vanes 46. Each of the vanes in these sets is a thin, flat vane lying in a plane which extends through the longitudinal central axis of the lure of FIG. 8. At the forward end of the cylindrical main body 40 is a propeller 43 having a hub 45. A fishing line 47 is tied to an eye in the forward end of a wire 48 which extends through an opening in the hub 45 of propeller 43. Rearwardly on the wire 48 is a spacer 50, a swivel ball 52 and a loop 54 for supporting the fishing hook 56. Of course, as the device is drawn through the water by the line 47, the propeller 43 will cause rotational movement of the cylindrical main body 40 and the vanes 42, 44 and 46.

The first set of vanes 42 is formed of ten blades spaced 36° apart with respect to the longitudinal axis of the device. The second set of vanes 44 includes twelve blades which are spaced apart 30°, while the third set of vanes 46 includes fifteen blades spaced 24° apart. As the device rotates upon movement through the water, it will be appreciated that the prescribed spacing of the vanes will produce sounds having a frequency ratio which is a musical triad in the minor scale.

In the embodiment of FIG. 9, there are also three sets of vanes, constructed to produce a musical triad. In this instance, the vanes are self-rotating in that they are thin, flat pieces which are inclined with respect to the longitudinal axis of the device, thus providing both a rotational-driving function and a sonic-generating function. The forward disc 60 is provided with a plurality of extending vanes 62; the intermediate disc 64 carries the vanes 66; and, the rear disc 68 includes the integral third set of vanes 70. The vanes 62, 66 and 70 are spaced apart either to produce a triad in the major musical scale or a triad in the minor musical scale, such spacing have been described previously with respect to FIGS. 3 and 8. The discs 60, 64 and 68 may be affixed and held rotationally on a central hub 72 which has a central bore for receiving a wire 74, the forward end of which is connected to the fishing line 76. Rearwardly of the hub 72 is a spacer 77 and a ball 78 which enable the hub 72 and the discs thereon to rotate about the longitudinal axis of the lure. A fishhook 80 is attached to the rear end of wire 74.

Persons familiar with the art will appreciate that the principles of the invention are adaptable to many devices in addition to the typical embodiments disclosed herein. Modifications to the FIG. 1 structure are envisioned where there is contact between the propeller and the sonic generator to provide a "plucking" action on wires of the sonic generator; where the vanes of the sonic generator are inclined to give it a rotational movement; or, where the sonic generator is positioned forwardly of the propeller or other cooperating member. Therefore, it is emphasized that the invention is not limited solely to the disclosed embodiments, but is encompassing of a wide variety of other structures which fall within the spirit of the following claims.

I claim:
1. A sonic fishing lure movable through the water in a path coincident to its longitudinal axis, comprising,
attachment means connectible by a fishing line so that movement of the fishing line will draw the lure forwardly in the water,
a rotary member provided with blades which have surfaces lying at an acute angle to said longitudinal axis, said rotary member supported for rotational movement about said longitudinal axis in response to movement of the lure through the water,
a second member lying adjacent to said rotary member, said second member having obstructions lying in the path of water moving between said blades, said obstructions being discontinuous in directions circumferential to said longitudinal axis so as to present a varying impediment to water flowing between the blades to generate sonic waves in the water, one said member having an external bearing surface lying concentric with said axis, and the other member having an internal bearing surface riding on said external bearing surface.

2. The sonic fishing lure of claim 1 wherein the attachment means is a loop in the forward end of a wire, said wire extending centrally through said rotary member and said second member.

3. The sonic fishing lure of claim 1 wherein the rotary member is positioned forwardly of the second member.

4. The sonic fishing lure of claim 1 wherein the obstructions are dimensioned and spaced apart by distances which produce sonic waves forming a musical triad.

5. A sonic fishing lure having,
first means for generating sonic waves of one frequency in response to movement thereof through the water at a given velocity,
second means for generating sonic waves of a second frequency in response to movement thereof through the water at said given velocity,
third means for generating sonic waves of a third frequency in response to movement thereof through the water at said given velocity, each of said means comprising a set of members spaced apart by fixed distances,
the members in the first means being angularly spaced from each other by x degrees, the members in the second means being angularly spaced from each other by y degrees and the members in the third means being angularly spaced from each other by z degrees, and the ratio x:y:z is 10:12:15,
said frequencies together forming a musical triad.

6. The sonic fishing lure of claim 5 having means for rotating said sets of members about a central axis in response to movement thereof through the water.

7. The sonic fishing lure of claim 5 wherein the three sets of members are immovable with respect to each other and extend outwardly from a common longitudinal axis.

8. The sonic fishing lure of claim 7 wherein the three sets of members are in a common transverse plane, a rotary member positioned forward of and proximate to said members, said rotary member having blades inclined to produce rotary movement thereto upon movement through the water, said blades being separated by circumferential gaps which intermittently move into alignment with said members whereby water flowing through said gaps will strike said members to produce said sonic waves.

9. A sonic fishing lure movable through the water in a path coincident to its longitudinal axis, comprising,
attachment means connectible by a fishing line so that movement of the fishing line will draw the lure forwardly in the water,
a rotary member provided with blades which have surfaces lying at an acute angle to said longitudinal axis, said rotary member supported for rotational movement about said longitudinal axis in response to movement of the lure through the water,
a second member lying adjacent to said rotary member, said second member having obstructions lying in the path of water moving between said blades, said obstructions being discontinuous in directions circumferential to said longitudinal axis so as to present a varying impediment to water flowing between the blades to generate sonic waves in the water,
said obstructions extending radially from said axis and having a dimension measured circumferentially with respect to said axis which is at least as great as the corresponding circumferential distance between said blades.

10. A sonic fishing lure having,
first means for generating sonic waves of one frequency in response to movement thereof through the water at a given velocity,
second means for generating sonic waves of a second frequency in response to movement thereof through the water at said given velocity,
third means for generating sonic waves of a third frequency in response to movement thereof through the water at said given velocity, each of said means comprising a set of members spaced apart by fixed distances, the members in the first means being angularly spaced from each other by x degrees, the members in the second means being angularly spaced from each other by y degrees and the members in the third means being angularly spaced from each other by z degrees, and the ratio x:y:z is 6:5:4,
said frequencies together forming a musical triad.

* * * * *